United States Patent
O'Hare et al.

(10) Patent No.: US 10,877,936 B2
(45) Date of Patent: Dec. 29, 2020

(54) DATA DEDUPLICATION USING TRUNCATED FINGERPRINTS

(71) Applicant: EMC IP HOLDING COMPANY LLC, Hopkinton, MA (US)

(72) Inventors: Jeremy J. O'Hare, Westborough, MA (US); Rong Yu, West Roxbury, MA (US); Peng Wu, Westborough, MA (US); Michael J. Scharland, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 286 days.

(21) Appl. No.: 15/968,825

(22) Filed: May 2, 2018

(65) Prior Publication Data

US 2019/0340262 A1    Nov. 7, 2019

(51) Int. Cl.
*G06F 16/30*     (2019.01)
*G06F 16/174*    (2019.01)
*G06F 16/901*    (2019.01)

(52) U.S. Cl.
CPC ...... *G06F 16/1748* (2019.01); *G06F 16/9014* (2019.01)

(58) Field of Classification Search
CPC .......................... G06F 16/9014; G06F 16/1748
USPC ...................................................... 707/692
See application file for complete search history.

(56) References Cited

U.S. PATENT DOCUMENTS

| | | | |
|---|---|---|---|
| 9,141,372 B1* | 9/2015 | Sarkar | G06F 8/65 |
| 2009/0307251 A1* | 12/2009 | Heller | G06F 16/217 |
| 2012/0166401 A1* | 6/2012 | Li | G06F 16/215 |
| | | | 707/692 |
| 2019/0120970 A1* | 4/2019 | Vigen | G01S 19/03 |

* cited by examiner

*Primary Examiner* — Kuen S Lu
(74) *Attorney, Agent, or Firm* — Krishnendu Gupta; Anne-Marie Dinius

(57) ABSTRACT

The system, devices, and methods disclosed herein relate to data ratio reduction technology adapted to reduce storage costs by weeding out duplicative data write operations. The techniques and systems disclosed achieve deduplication benefits by reducing the size of hash values stored hash tables used to compare unwritten data blocks to data that has already been written and stored somewhere in physical storage. The data deduplication systems, methods, and products facilitate deduplication at the block level as well as for misaligned data chunks within data blocks, that is an unwritten data block that has been stored sequentially in two different physical locations. The deduplication teachings herein are amenable to varying data block sizes as well as data chunk sizes within blocks. Our embodiments enhance computer performance by substantially reducing computational speeds and storage requirements attendant to deduplication systems using larger hash table data sizes.

20 Claims, 6 Drawing Sheets

DATA DEDUPLICATION USING TRUNCATED FINGERPRINTS

FIELD OF THE INVENTION

This disclosure is related to the field of data storage and, more particularly, to systems and methods for reducing overhead and improving data deduplication in data storage systems.

BACKGROUND

As we move into cloud-based computing environments, more and more data are being stored and made available to end users. In the not so distant past, the most voracious consumers of data were all corporate entities. More recently, the cost of data transmission and storage have decreased. With that decrease in cost has come an increase in data volume. Storing the ever increasing documents, emails, Excel spread sheets, PowerPoints, employee records, financial records, photographs, videos, and the like, that get distributed throughout a network on a daily basis is a daunting task for data storage providers and the organizations who purchase their products.

In order to provide reliable, and oftentimes redundant data storage, data storage systems routinely perform back-ups as a means of protecting against equipment failure within a data storage system. While data back-ups are an essential means of ensuring data availability into the future, they have the drawback of multiplying data by duplicating data files in a way that can grow exponentially very quickly. In a system where there is no removal of redundant data files, data backups can contain enormous amounts of redundant data. As an example, if someone in a company having an email back-up system in place shared a video with his co-workers via email and the video went viral within the organization, there would be many, many copies of the same video stored on the email back-up data storage system.

As the need for data storage continues to grow, the importance of data reduction technology becomes increasingly important to address the cost of storage. There are many flavors of data reduction technology, but generally, they fall into two categories: compression and deduplication. Compression involves a complex algorithm of looking for patterns within a buffer, and finding ways to store them more efficiently, resulting in a smaller buffer. The larger the buffer is, the better the compression results will be because there are more opportunities to find patterns.

Deduplication does not modify the buffer, but rather looks at all of the buffers where data has already been stored to see if there are any matching data strings. Counter to compression, deduplication works best for smaller buffers. As an example, it is easier in a library to find two words that match than it would be to find two sentences or two pages.

Block level storage arrays typically perform compression and deduplication at 4 KB, 8 KB, 16 KB, and 128 KB blocks. In these increments, the smaller blocks receive better deduplication, while the larger blocks receive better compression. Another extremely important impact of block size is the cost of metadata (MD). Arrays storing data at the 4 KB level require 32 times more metadata than similar arrays using a 128 KB block size.

Hash tables are used as a means of storing a randomized value uniquely associated with a data chunk. In deduplication, hash tables are consulted before data is written to storage to determine if the data block has already been written elsewhere in storage. If it has, deduplication principles indicate that there is no need to write the particular block being evaluated because it is already being stored elsewhere in physical storage.

When duplicate blocks are found, instead of storing the entire block awaiting writing, deduplication algorithms, methods, and products store mapping information that connects the stored supplicate data to the client desiring to write what has been deemed a duplicate block of data. Mapping information is typically stored as metadata. Generally speaking, the finer the granularity of deduplication performed, the larger the amount of metadata is required to reconcile the mapping between duplicate data chunks and/or data blocks. Although this is a simplified description of data deduplication principles, the general principles provide a foundation for the hashing chain methods, systems and devices described herein.

Hash tables used in today's deduplication systems, methods and products typically store hash values that range from 20 bytes to 32 bytes in size. The larger the size of the hash value, the greater the certainty it uniquely represents an exact copy of the data from which it was derived.

In data deduplication, each hash value stored in a hash table corresponds to a data chunk that has been stored in physical storage. For a 128 KB block of data having four 32 KB blocks of data, the corresponding hash table could contain four, 32 byte hash values or four 20 byte hashes, each correlated with a different 32 KB data chunk. The hash table would therefore be either 80 bytes or 128 bytes.

Reducing the hash value size to 20 bytes decreases the search time required to determine if a particular data block has already been stored in permanent, also called physical, storage. In today's markets, there is constant pressure to enhance data storage system performance by increase read/write functionality. One way to achieve this goal is to enhance the speed with which the storage systems can perform deduplication prior to committing a write request to physical storage.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter that is set forth by the claims presented below. All examples and features mentioned below can be combined in any technically possible way.

The system, devices, and methods disclosed herein relate to data ratio reduction technology adapted to reduce storage costs by weeding out duplicative data write operations. The techniques and systems disclosed achieve deduplication benefits by reducing the size of hash values stored hash tables used to compare unwritten data blocks to data that has already been written and stored somewhere in physical storage. The data deduplication systems, methods, and products facilitate deduplication at the block level as well as for misaligned data chunks within data blocks, that is an unwritten data block that has been stored sequentially in two different physical locations. The deduplication teachings herein are amenable to varying data block sizes as well as data chunk sizes within blocks. Our embodiments enhance computer performance by substantially reducing computational speeds and storage requirements attendant to deduplication systems using larger hash table data sizes.

In embodiments, we disclose a computer executable method for deduplicating data within a data storage system during a write operation comprising the steps of: (a) calculating a plurality of hash values corresponding to a plurality of unwritten data chunks within an unwritten data block; (b) storing the plurality of hash values corresponding to the plurality of unwritten data chunks in a memory; (c) iteratively truncating the plurality of hash values corresponding to the plurality of unwritten data chunks using a first truncating function and a second truncation function; (d) comparing a resultant iteratively truncated hash string to a hash table, wherein the hash table contains hash values corresponding to stored data blocks, the stored hash values having been created using the first truncating function and the second truncating function; (e) determining if a sequential match between two iteratively truncated hash values and a first stored hash table value and a last stored hash table value can be found; and (f) deduplicating the unwritten data block if two sequential matches are found.

In alternate embodiments, we disclose a system for deduplicating data within a data storage system during a write operation comprising a memory and a processor, the processor configured to perform the steps of: (a) calculating a plurality of hash values corresponding to a plurality of unwritten data chunks within an unwritten data block; (b) storing the plurality of hash values corresponding to the plurality of unwritten data chunks in a memory; (c) iteratively truncating the plurality of hash values corresponding to the plurality of unwritten data chunks using a first truncating function and a second truncation function; (d) comparing a resultant iteratively truncated hash string to a hash table, wherein the hash table contains hash values corresponding to stored data blocks, the stored hash values having been created using the first truncating function and the second truncating function; (e) determining if a sequential match between two iteratively truncated hash values and a first stored hash table value and a last stored hash table value can be found; and (f) deduplicating the unwritten data block if two sequential matches are found.

In yet alternate embodiments, we disclose a compute product for deduplicating data within a data storage system during a write operation, the computer program product being embodied in a tangible, non-transitory computer readable storage medium and comprising computer instructions for (a) calculating a plurality of hash values corresponding to a plurality of unwritten data chunks within an unwritten data block; (b) storing the plurality of hash values corresponding to the plurality of unwritten data chunks in a memory; (c) iteratively truncating the plurality of hash values corresponding to the plurality of unwritten data chunks using a first truncating function and a second truncation function; (d) comparing a resultant iteratively truncated hash string to a hash table, wherein the hash table contains hash values corresponding to stored data blocks, the stored hash values having been created using the first truncating function and the second truncating function; (e) determining if a sequential match between two iteratively truncated hash values and a first stored hash table value and a last stored hash table value can be found; and (f) deduplicating the unwritten data block if two sequential matches are found.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Referring now to the figures of the drawings, the figures comprise a part of this specification and illustrate exemplary embodiments of the described system. It is to be understood that in some instances various aspects of the system may be shown schematically or may be shown exaggerated or altered to facilitate an understanding of the system. Additionally, method steps disclosed herein can be performed within a processor, a memory, a computer product having computer code loaded thereon, and the like.

Figure 1:
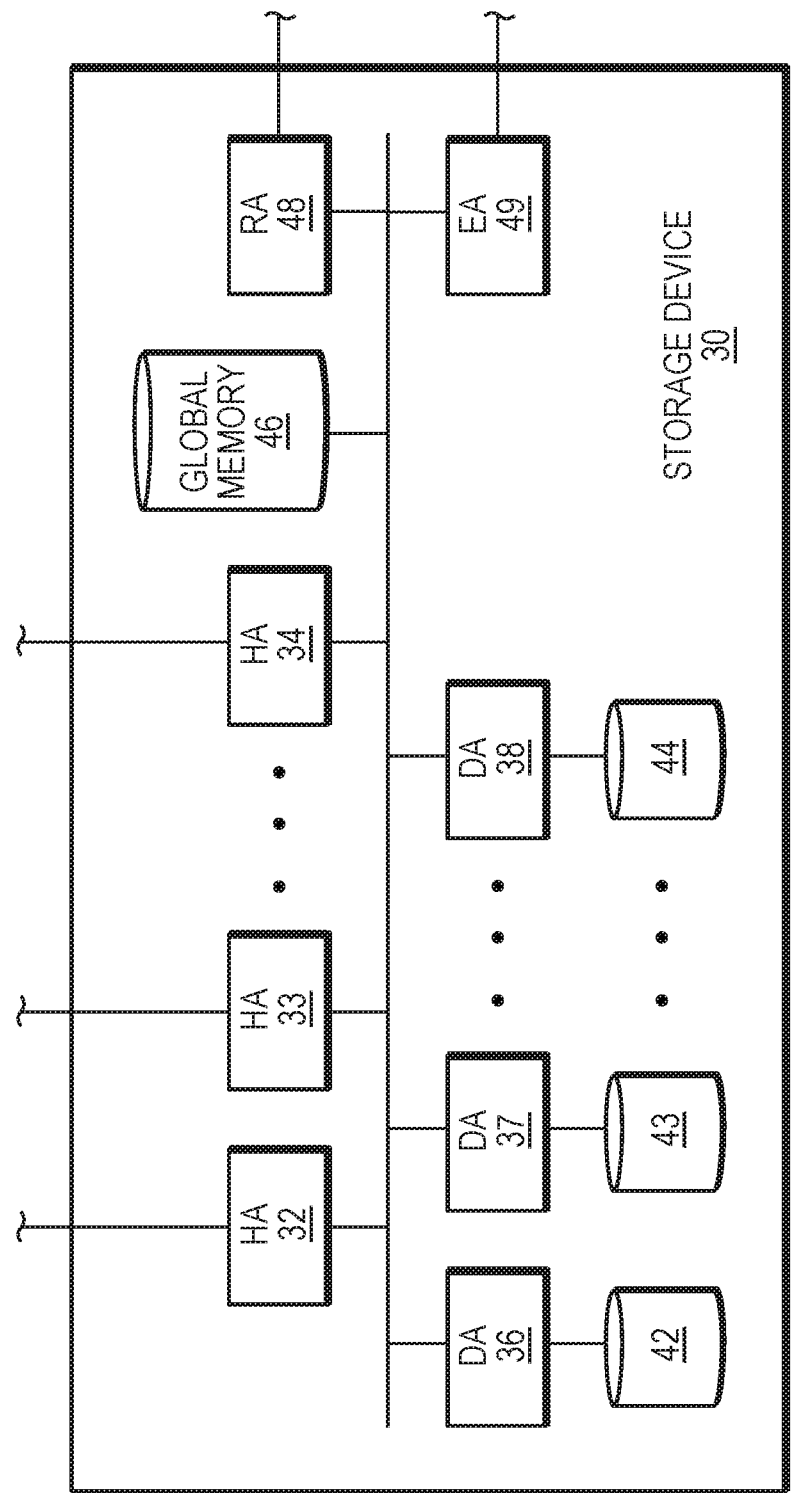
FIG. 1 is a schematic diagram showing a plurality of hosts and a data storage device in connection with an embodiment of the system described herein.

FIG. 1 is a schematic illustration showing a storage device 30 that includes a plurality of host adapters (HA) 32-34, a plurality of disk adapters (DA) 36-38 and a plurality of disk drives 42-44. The disk drives 42-44 should be understood as representing any appropriate type of storage media, including, without limitation, DRAM cache, flash or other solid-state storage device, tape, optical media, and/or any combination of permanent, semi-permanent and temporally-limited storage media. Each of the disk drives 42-44 is coupled to a corresponding one of the DA's 36-38. Although FIG. 1 shows a one-for-one correspondence between the DA's 36-38 and the disk drives 36-38, it should be understood that it is possible to couple more than one disk drive to a DA and/or to couple more than one DA to a disk drive. The storage device 30 also includes a global memory 46 that may be accessed by the HA's 32-34 and the DA's 36-38. The storage device 30 also includes an RDF adapter (RA) 48 that may also access the global memory 46. The RA 48 may communicate with one or more additional remote storage devices (not shown) and/or one or more other remote devices (not shown) via a data link 22. The storage device also includes an external storage adaptor (EA) 49 that may be used to communicate with one or more other storage devices (not shown) that could either be the same type of storage device as the storage device 30 or could be a different type of storage device. The HA's 32-34, the DA's 36-38, the global memory 46, the RA 48 and the EA 49 may be coupled to a bus 24 that is provided to facilitate communication therebetween. In various embodiments, additional RA's and/or EA's may be incorporated into the storage device 30.

Each of the HA's 32-34 may be coupled to one or more host computers (not shown) that access the storage device 30. The host computers (hosts) access data on the disk drives 42-44 through the HA's 32-34 and the DA's 36-38. The global memory 46 contains a cache memory that holds tracks of data read from and/or to be written to the disk drives 42-44 as well as storage for tables that may be accessed by the HA's 32-34, the DA's 36-38, the RA 48, and the EA 49. Note that, for the discussion herein, blocks of data are described as being a track or tracks of data. However, it will be appreciated by one of ordinary skill in the art that the system described herein may work with any appropriate incremental amount, or section, of data, including possibly variable incremental amounts of data and/or fixed incremental amounts of data and/or logical representations of data, including (but not limited to) compressed data, encrypted data, or pointers into de-duplicated data dictionaries.

Figure 2:
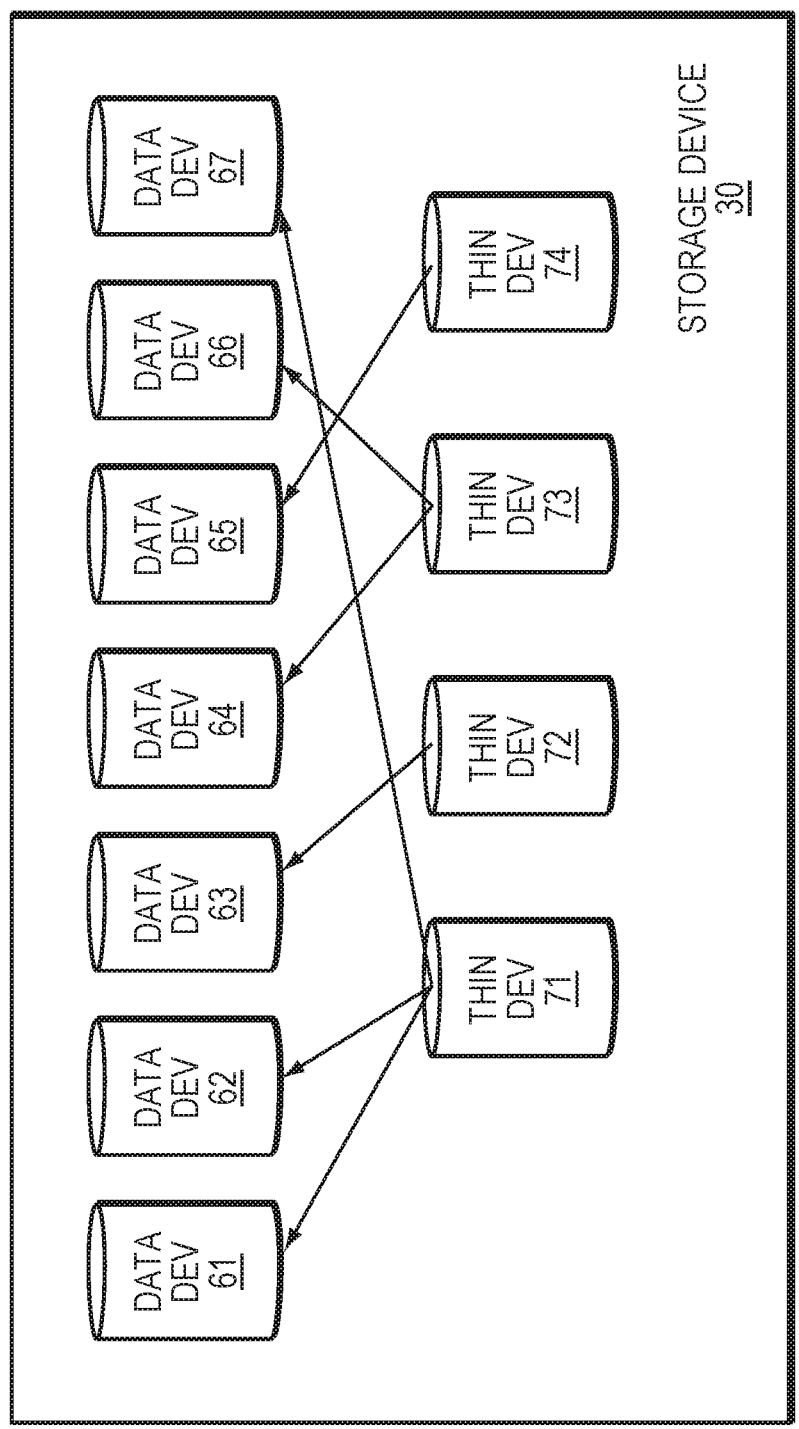
FIG. 2 is a schematic diagram showing a storage device including thin devices and data devices in connection with an embodiment of the system described herein.

FIG. 2 is a schematic diagram showing the storage device 30 as including a plurality of data devices 61-67. Data devices 61-67 may be implemented as logical devices like standard logical devices provided in a Symmetrix data storage device. In some embodiments, the data devices 61-67 may not be directly useable (visible) to hosts coupled to the storage device 30. Each of the data devices 61-67 may correspond to a portion (including a whole portion) of one or more of the disk drives 42-44. Thus, for example, the data device 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein.

The storage device 30 may also include one or more thin devices 71-74. Each of the thin devices 71-74 may appear to a host coupled to the storage device 30 as a logical volume (logical device) containing a contiguous block of data storage. Each of the thin devices 71-74 may contain tables that point to some or all of the data devices 61-67 (or portions thereof), as further discussed elsewhere herein. In some instances, the thin devices 71-74 may be concatenated to form a metavolume of thin devices. In some embodiments, only one thin device may be associated with the same data device while, in other embodiments, multiple thin devices may be associated with the same data device.

In some embodiments, it may be possible to implement the system described herein using storage areas, instead of storage devices. Thus, for example, the thin devices 71-74 may be thin storage areas, the data devices 61-67 may be standard logical areas, and so forth. In some instances, such an implementation may allow for hybrid logical devices where a single logical device has portions that behave as a data device and/or portions that behave as a thin device. Accordingly, it should be understood that, in appropriate instances, references to devices in the discussion herein may also apply to storage areas that may or may not correspond directly with a storage device.

In today's storage systems, about 25% of the overall cost of the storage system is the storage engine and its associated software, hardware, and firmware. The remaining 75% of the cost can be attributed to the storage drives. Against this backdrop, it stands to reason that improving data storage efficiency would dramatically reduce data storage costs. Data Reduction Ratio (DRR) is a key indicator of improve data storage efficiency. The systems and methods disclosed herein improve DRR, and accordingly, improve the efficiency and performance of data storage devices.

Systems, methods, and computer program products disclosed herein could be executed on architecture similar to that depicted in FIGS. 1 and 2. For example, method steps could be performed by processors either communicatively coupled to storage device 30 or internal, to storage device 30. Similarly, global memory 46 could contain computer executable code sufficient to orchestrate the steps described and claimed herein. Likewise a computer program product internal to storage device 30 or coupled thereto could contain computer executable code sufficient to orchestrate the steps described and claimed herein.

Figure 3:
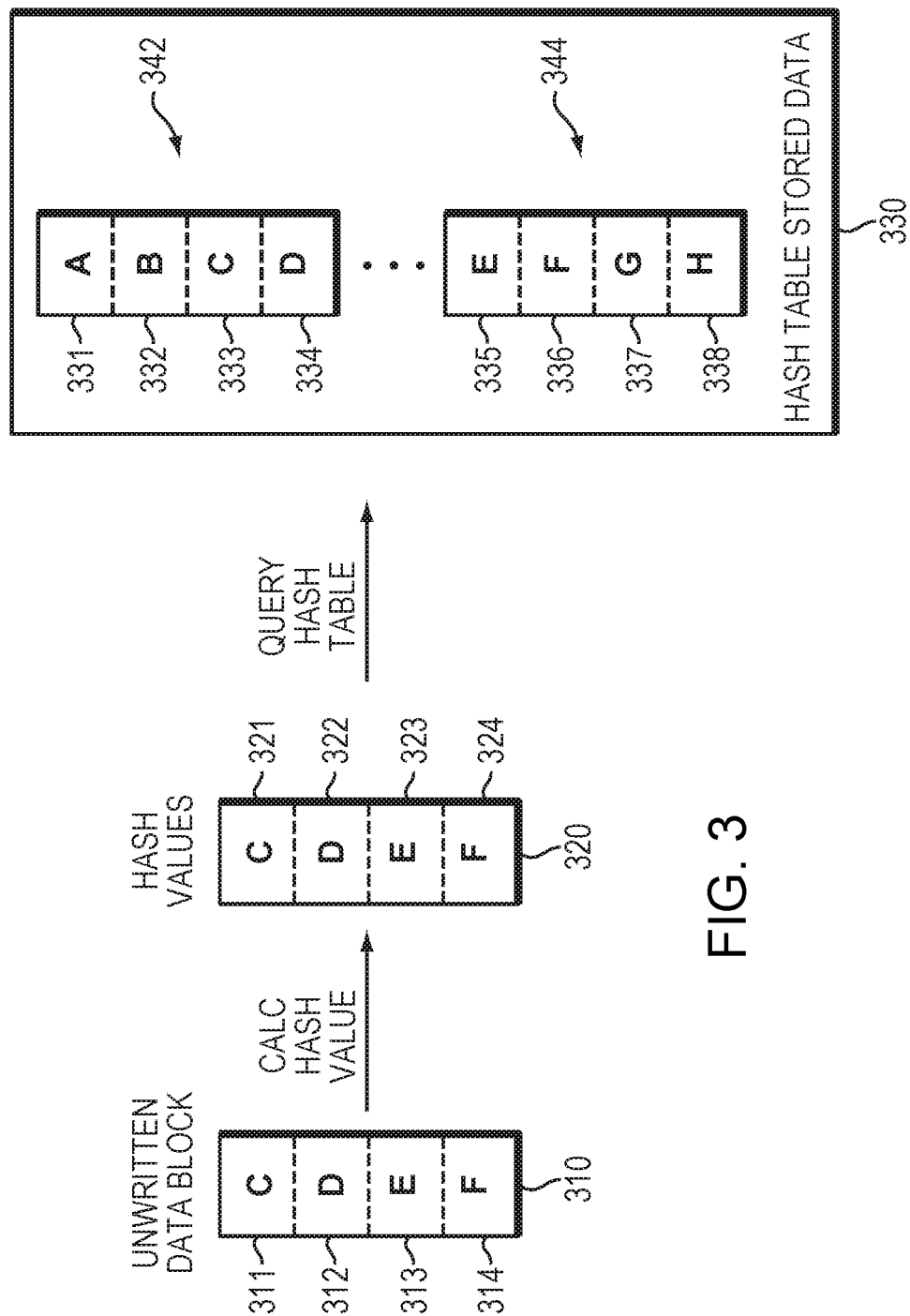
FIG. 3 is a schematic diagram showing data deduplication techniques described in embodiments herein.

With reference to FIG. 3, we show a high level schematic for the data deduplication process using hash tables. FIG. 3 depicts an unwritten data block 310 having data chunks C 311, D 312, E 313, and F 314. Data block 310 has been queued by a user connected to storage device 30 to be written to physical storage, which could be data devices 61-67.

Generally speaking, in order to avoid writing duplicate blocks of data to the physical storage, data deduplication techniques create hash values for each of the data chunks in unwritten data block prior to committing the unwritten data block to physical storage. Once the hash values have been created, they are compared with hash values in an existing hash table, which corresponds to all of the data blocks currently in physical storage. FIG. 3 shows a hash table 320 for unwritten data block 310. In addition, FIG. 3 depicts a hash table 330 for data blocks that have been stored in the past.

At a high level, most commercial deduplication products would create a hash table for unwritten data block 310. The hash table corresponding to the unwritten data block 320 would be compared with the hash table 330 for stored data. If a match was found, the unwritten data block 310 would be flagged for deduplication, in other words, it would not be written to permanent storage. Instead, a series of pointers would be recorded so that the user requesting the write operation could access the data block in the future. The pointers would indicate, among other things, the location of the matching data block.

FIG. 3 shows a misalignment between the unwritten data block 310 previously stored data blocks 342 and 344. Those of skill in the art recognize that an aligned data deduplication would be posed when there was a sequential, one-to-one correspondence between unwritten data chunks 311-314 and data chunks corresponding to either hash block 342 or hash block 344. The misalignment occurs because hash values corresponding to unwritten data chunks 311 and 312 can be found in hash block 342, while hash values corresponding to unwritten data chunks 313 and 314 can be found in hash block 344.

As a practical matter, hash blocks 342 and 344 may not by located on sequential tracks within physical storage 61-67. Without misaligned data deduplication capabilities, unwritten data block 310 would be written to physical storage because prior art deduplication techniques would not have noticed that the data within 311-314, namely C D E F has already been written sequentially in physical storage in no more than two locations or data blocks, namely the data blocks corresponding to hash blocks 342 and 344. Embodiments disclosed herein have the added advantage of being able to recognize misaligned duplicate data chunks when those chunks have been written sequentially in no more than two different physical storage locations.

Figure 4:
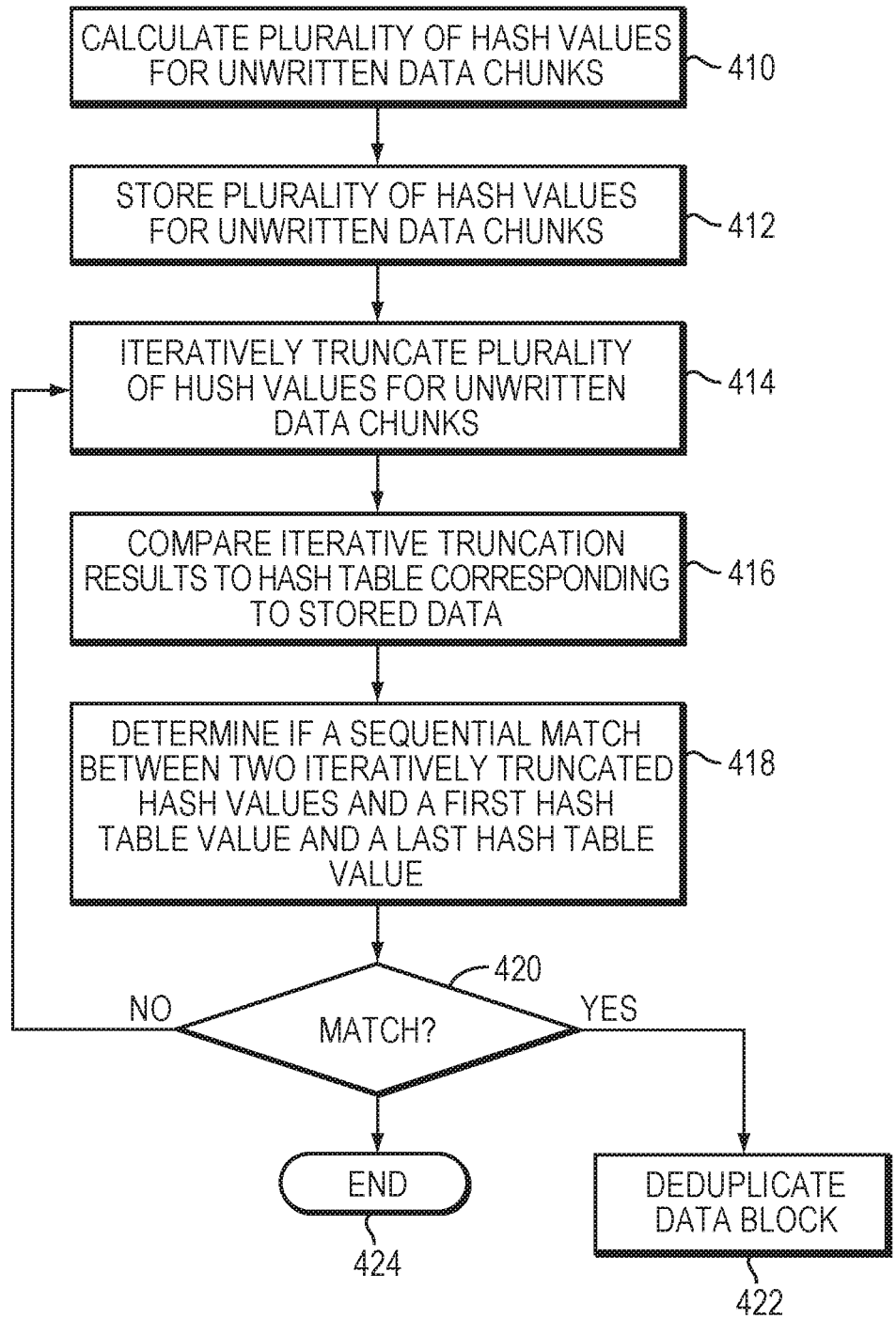
FIG. 4 is a flow chart showing exemplary steps according to systems, methods, and devices disclosed herein.

FIG. 4 depicts method steps according to embodiments that can be used to enhance data deduplication performance. As an initial matter, we calculate 410 individual hash values for unwritten data chunks 311-314. In some embodiments, an SHA2 hashing function could be used to calculate 410 hash values for unwritten data chunks 311-314. In alternate embodiments, an SHA256 or similar hashing function could be used. In either of these embodiments, the calculation 410 will result in a 32-byte value for each unwritten data block 311-314, which is shown in hash table 320.

Hash table 320 contains a plurality of hash values 321-324. In most embodiments, the size of hash values 321-324 is 32 bytes. In all embodiments, hash values 321-324 have a one-to-one correspondence with the unwritten data chunk 311-314 from which they were derived. In order to avoid confusion with hash values associated with stored data in this specification, we distinguish hash values 321-324 as being related to the plurality of unwritten data chunks, as opposed to hash values associated with stored data blocks 331-338.

Next we store 412 the plurality of hash values 320 corresponding to unwritten data block. Hash values 320 could be stored in memory 46, in data devices 61-67 or thin devices 71-74.

Figure 5A:
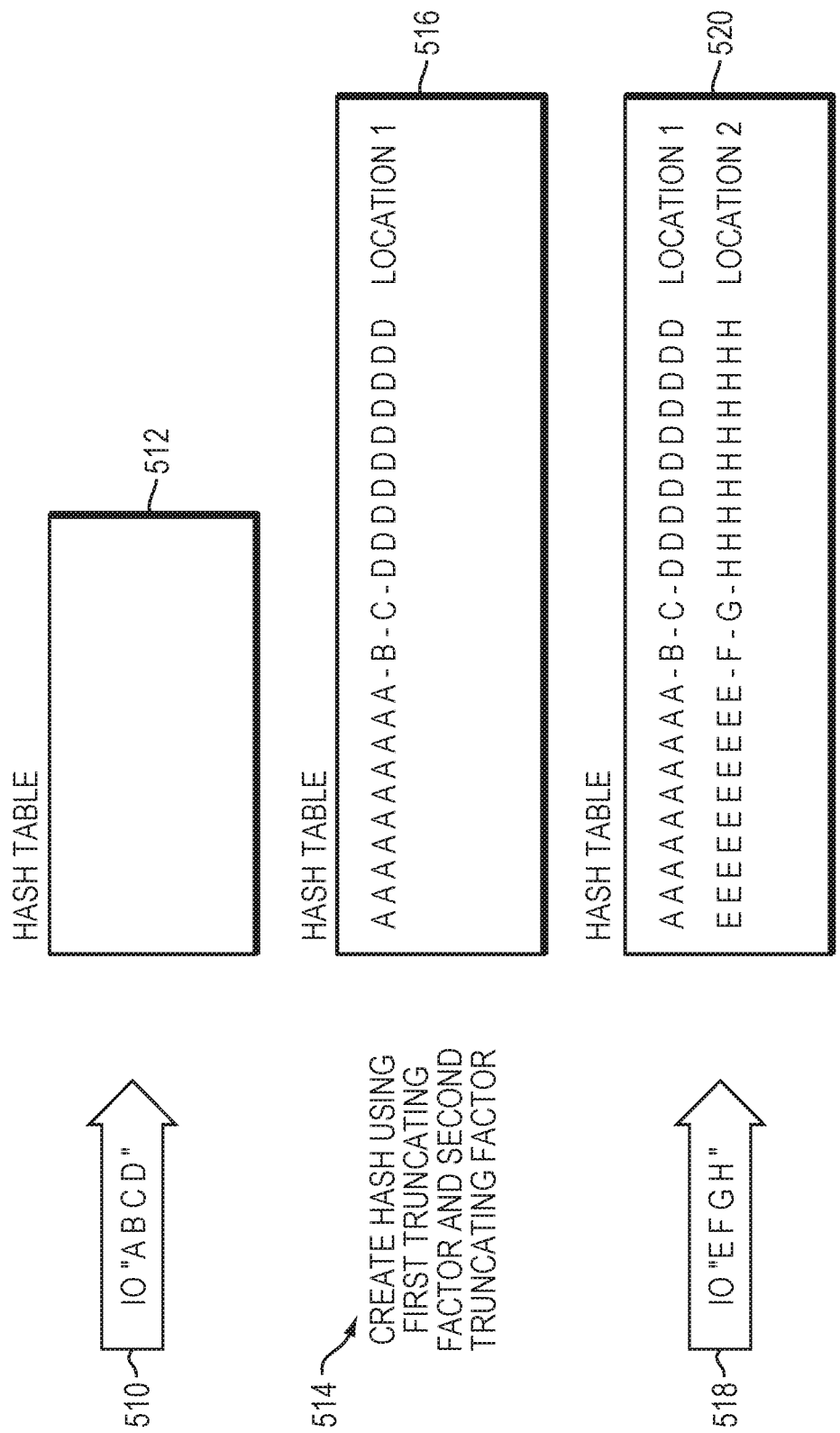
FIG. 5A is a schematic diagram showing data deduplication techniques in connection with embodiments herein.

From there, we iteratively truncate 414 each of the unwritten hash values 321-324 using a first truncating function and a second truncating function. The iterative truncation process is best explained with reference to FIGS. 5A and 5B. FIG. 5A shows the process of storing hash values for data that is ultimately stored in physical storage. The hash table 520 that is created in embodiments of this invention uses a two-layered truncation in order to shrink the standard 32 byte size hash values down to smaller sizes. As will be explained below, the first and last hash value, which corresponds to the first data chunk in a written data block and the last data chunk in a written block will be larger than the intermediary hash values corresponding to intermediary data chunks in written data blocks.

Those of skill in the art recognize that shrinking the size of the hash value increases the probability of a false-positive match between disparate data sets. In embodiments, we use data patterns to shrink the acceptable size of the hashes to a size that will not result in an inordinate amount of false-positives, while simultaneously keeping the size of each hash value small enough to realize expediencies in the deduplication searching process.

FIG. 5A shows how hash tables are created according to embodiments when data chunks are written to physical storage. At step 510, the data storage system receives an IO request, in some embodiments from a queue storing write requests received by the system. The IO request contains data chunks A B C D. In order to determine if these data chunks have already been stored in at most two physical locations within the data storage system, embodiments would query a hash table to determine if hash values corresponding to data chunks A B C D appear within the hash table. In this example, hash table 512 is empty. Accordingly, data chunks A B C D will be stored in physical storage.

In order to account for A B C D being stored in physical storage, we create 514 hash values representative of A B C D by using a first truncating function and a second truncating function. As previously stated, common hash functions in use today create 32 byte hash values associated with a particular data set. Using known hashing functions on data chunks ABCD would result in four 32-byte hashes. In typical systems of today, these 32 byte hash values would be stored in a hash table along with a physical location indicating where the data block A B C D was stored.

In embodiments herein, we truncate the 32 byte hash values using two different truncating functions. The first truncating function and the second truncating function are equivalent to the truncating function used at step 414 with regard to unwritten data blocks 311-314. In embodiments, the second truncating function results in a hash data size that is smaller than the hash data size obtained with the first truncating function. In FIG. 5A, the first truncating function reduces the data size of hash values corresponding to data chunk A and D to 10 bytes each, as shown in hash table 516. The second truncating function in this example reduces the size of the hash values associated with data chunks B C to 1 byte each, as shown in hash table 516. In alternate embodiments, the amount of truncation for the first and second truncating can vary.

For purposes of this invention, it is not as important how the first truncating function or the second truncating function reduces the data size of hash values from 32 bytes to something less than that, e.g., 10 bytes and 1 byte, as it is that the function performs consistently each time it is called. For example, in reducing a 32 byte hash to a 10 byte hash, the first truncating function could use the first 10 bytes in the 32-byte hash and discard the remaining 22 bytes. Alternatively, the first truncating function could use the last 10 bytes of the original 32 byte hash and discard the first 22 bytes of the original hash value. The second truncating function works similarly.

In alternate embodiments, the first truncating function or the second truncating function could be any function that results in reducing the size of the original hash value below 32 bytes. In preferred embodiments, the first truncating function reduces the size of the hash values to less than 20 bytes. In alternate preferred embodiments, the first truncating function reduces the hash values to 10 bytes. In preferred embodiments, the second truncating function reduces the hash values to less than 5 bytes. In alternate preferred embodiments, the second truncating function reduces the hash values to 1 byte.

Referring again to FIG. 5A, at step 518, the system receives another IO request to write a data block containing data chunks E F G H. The deduplication mechanism will check hash table 516, in accordance with the steps described herein, to determine if data chunks E F G H have already been written in physical storage in no more than two locations. Having determined that E F G H have not been written, embodiments herein will create a hash entry for E F G H using the first truncating function and the second truncating function as shown in hash table 520.

Figure 5B:
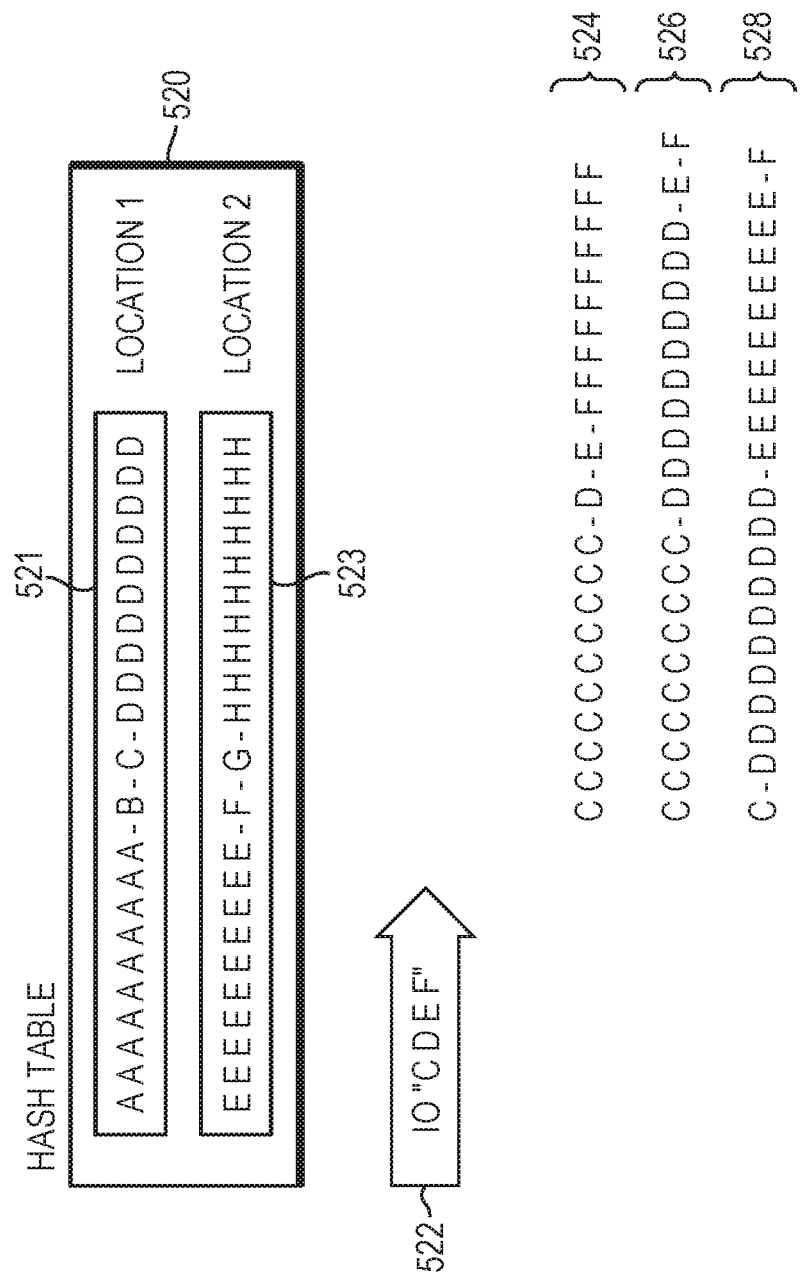
FIG. 5B is a schematic diagram showing data deduplication techniques in connection with embodiments herein.

FIG. 5B shows the iterative process associated with determining 416 if an unwritten data block has already been stored in physical storage. In this example, hash table 512 contains entries for IO request having data blocks A B C D 510 and E F G H 518. As can be seen, the hash value associated with the first and last data chunk of these two data blocks are larger than the hash values for data chunks in the middle of a data block. In this example, we use a data block having four data chunks. Our exemplary data block is 128 KB with four 32 KB data chunks. The teachings herein are not limited to this size arrangement. In alternate embodiments, there could be 128 KB data blocks having 16 KB data chunks. There could be 128 KB data blocks having 8 KB data chunks. Alternatively, there could be 32 KB data blocks having 8 KB data chunks. In yet an alternate embodiment, there could be a 100 KB data block having 10 KB data chunks. The size options are limitless.

Irrespective of the size of the data blocks and data chunks used in storage systems employing embodiments of this invention, the size of the hash values for the first and last data chunk of stored data will be larger than the size of the hash values for the intermediary stored data chunks as shown in hash table 520. Said differently, in a scenario where there was a 128 KB data chunk having eight 16 KB data chunks represented by 1-8, the hash value corresponding to this data block would be 1111111111-2-3-4-5-6-7-8888888888.

Returning to FIG. 5B, during processing of uncommitted write requests, the data deduplication system receives a request to write 522 a data block having data chunks C D E F. As part of the deduplication process, embodiments will iteratively truncate 414 the hash values associated with these unwritten data chunks in order to determine 416 if data chunk C D E F has already been sequentially stored in physical storage in no more than two locations. This determination 416 is made by comparing each iterative hash string 524-528 to the values stored in hash table 520 until a sequential match is found between a first and last hash value in no more than two physical locations.

In some embodiments, the first truncating function could reduce the size of the first and last hash values to 20 bytes or less. In alternate embodiments, the first truncating function could reduce the size of the unwritten hash values 321-324 to 10 bytes. In some embodiments, the second truncating function could reduce the size of the hash value to 5 bytes or less. In alternate embodiments, the second truncating function could reduce the size of the hash value to 1 byte. The process of iteratively truncating will be explained more fully below.

As a next step in the deduplication process, it is necessary to determine if the intended unwritten data block 310 has already been stored in physical storage 61-67. FIG. 3 shows a misalignment between the unwritten data block 310 previously stored data blocks 330 and 340. Those of skill in the art recognize that an aligned data deduplication would be posed when there was a sequential, one-to-one correspondence between unwritten data chunks 311-314 and data chunks corresponding to either hash block 330 or hash block 340. The misalignment occurs because hash values corresponding to unwritten data chunks 311 and 312 can be found in hash block 330, while hash values corresponding to unwritten data chunks 313 and 314 can be found in hash block 340.

As a practical matter, hash blocks 330 and 340 may not by located on sequential tracks within physical storage 61-67. Without misaligned data deduplication capabilities, unwritten data block 310 would be written to physical storage because prior art deduplication techniques would not have noticed that the data within 311-314, namely C D E F has already been written sequentially in physical storage in no more than two locations or data blocks, namely the data blocks corresponding to hash blocks 330 and 340. Embodiments disclosed herein have the added advantage of being able to recognize misaligned duplicate data chunks when those chunks have been written sequentially in no more than two different physical storage locations.

In order to determine if unwritten data block 310 has been stored sequentially in no more than two physical locations within physical storage, we iteratively compare 416 truncated hash values corresponding to query a hash table corresponding to data chunks stored in physical storage. The hash values corresponding to stored data have, themselves been truncated prior to being stored in the hash table using the first truncating function and the second truncating function. This process will be described with reference to FIG. 5A.

FIG. 5A shows how hash tables are created according to embodiments when data chunks are written to physical storage. At step 510, the data storage system receives an IO request, in some embodiments from a queue storing write requests received by the system. The IO request contains data chunks A B C D. In order to determine if these data chunks have already been stored in at most two physical locations within the data storage system, embodiments would query a hash table to determine if hash values corresponding to data chunks A B C D appear within the hash table. In this example, hash table 512 is empty. Accordingly, data chunks A B C D will be stored in physical storage.

In order to account for A B C D being stored in physical storage, we create 514 hash values representative of A B C D by using a first truncating function and a second truncating function. As previously stated, common hash functions in use today create 32 byte hash values associated with a particular data set. Using known hashing functions on data chunks ABCD would result in four 32-byte hashes. These 32 byte hashes would be stored in a hash table along with a physical location indicating where the data block A B C D was stored.

In embodiments herein, we truncate the 32 byte hash values using two different truncating functions. In embodiments, the second truncating function results in a hash data size that is smaller than the hash data size obtained with the first truncating function. In FIG. 5A, the first truncating function reduces the data size of hash values corresponding to data chunk A and D to 10 bytes each, as shown in hash table 516. The second truncating function in this example reduces the size of the hash values associated with data chunks B and C to 1 byte each, as shown in hash table 516. In alternate embodiments, the amount of truncation for the first and second truncating can vary.

For purposes of this invention, it is not as important how the first truncating function or the second truncating function reduces the data size of hash values from 32 bytes to something less than that, e.g., 10 bytes and 1 byte, as it is that the function performs consistently each time it is called. For example, in reducing a 32 byte hash to a 10 byte hash, the first truncating function could use the first 10 bytes in the 32-byte hash and discard the remaining 22 bytes. Alternatively, the first truncating function could use the last 10 bytes of the original 32 byte hash and discard the first 22 bytes of the original hash value. The second truncating function works similarly. Additionally, the iterative truncating, which will be discussed below, must be done in the same manner as the truncation for the hash values corresponding to stored data.

In alternate embodiments, the first truncating function or the second truncating function could be any function that results in reducing the size of the original hash value below 32 bytes. In preferred embodiments, the first truncating function reduces the size of the hash values to less than 20 bytes. In alternate preferred embodiments, the first truncating function reduces the hash values to 10 bytes. In preferred embodiments, the second truncating function reduces the hash values to less than 5 bytes. In alternate preferred embodiments, the second truncating function reduces the hash values to 1 byte.

Referring again to FIG. 5A, at step 518, the system receives another IO request to write a data block containing data chunks E F G H. The deduplication mechanism will check hash table 516, in accordance with the steps described herein, to determine if data chunks E F G H have already been written in physical storage in no more than two locations. Having determined that E F G H have not been written, embodiments herein will create a hash entry for E F G H using the first truncating function and the second truncating function as shown in hash table 520. The hash table 520 also stores a physical location, which could be on data devices 61-67 or thin devices 71-74, for each written data block.

FIG. 5B shows how hash values for unwritten data blocks are iteratively generated and compared to data in the current hash table 520 to determine if the unwritten data block 310 should be flagged for deduplication. In this example, hash table 520 contains entries for IO request having data blocks A B C D 510 and E F G H 518. As can be seen, the hash value associated with the first and last data chunk of these two data blocks are larger than the hash values for data chunks in the middle of a data block.

In this example, we use a data block having four data chunks. Our exemplary data block is 128 KB with four 32 KB data chunks. The teachings herein are not limited to this size arrangement. In alternate embodiments, there could be 128 KB data blocks having 16 KB data chunks. There could be 128 KB data blocks having 8 KB data chunks. Alternatively, there could be 32 KB data blocks having 8 KB data chunks. In yet an alternate embodiment, there could be a 100 KB data block having 10 KB data chunks. The size options are limitless.

Irrespective of the size of the data blocks and data chunks used in storage systems employing embodiments of this invention, the size of the hash values for the first and last data chunk of stored data will be larger than the size of the hash values for the intermediary stored data chunks as shown in hash table 520. Said differently, in a scenario where there was a 128 KB data chunk having eight 16 KB data chunks represented by 1-8, the hash value corresponding to this data block would be 1111111111-2-3-4-5-6-7-8888888888.

Returning to FIG. 5B, during processing of uncommitted write requests, the data deduplication system receives a request to write 522 a data block having data chunks C D E F. As part of the deduplication process, embodiments will iteratively truncate 414 the hash values associated with these unwritten data chunks in order to determine 418 if data chunk C D E F has already been sequentially stored in physical storage in no more than two locations. This determination 418 is made by comparing 416 each iterative hash string 524-528 to the values stored in hash table 520 until a sequential match is found between a first and last hash value in no more than two physical locations.

To explain the iterative nature of the comparison, we refer to FIGS. 3, 4 and 5B. In order to determine whether unwritten data block 310, 522 C-D-E-F should be written to physical storage or flagged as duplicate data, we calculate 410 a plurality of hash values for each data chunk 311-314 within the unwritten data block 310, 512. These hash values 321-324, which are 32 bytes each, are stored in memory 46. In alternate embodiments, devices 61-67 or thin devices 71-74 could also have memory storage space in which hash values 321-324 could be stored.

The iterative process of determining 418 if there unwritten block 310, 512 has already been stored in physical memory begins by truncating 414 a plurality of hash values 320 for the unwritten data block 310, 512. On the first iteration, the first 321 and last values 324 are truncated using a first truncating function. The intermediary hash values 322, 323 are truncated using a second truncating function. In this example, the resultant hash 524 contains a 10 byte hash "CCCCCCCCCC" corresponding to first hash value 321, a 10 byte hash "FFFFFFFFFF" corresponding to the last hash value 324, and one byte hashes for intermediary hash values 322, 323.

In order to determine 418 if unwritten data block 310 is duplicative of previously stored data, we compare 416 hash value 524 to the entries in hash table 520. In this comparison, we are looking for a match 420 between the two hash values in 524 that have been truncated using the first truncating function. Namely, we search hash table 520 for a match for "CCCCCCCCCC" and "FFFFFFFFFF." As can be seen, there is no match for either of these truncated hash values. If there had been a match, it would have been an aligned deduplication, meaning the exact same block, having data chunks C-D-E-F 311-314, is stored in a single location within physical storage.

Having found that there was no match 420 on the first iteration, we iteratively truncate hash values 321-324 again using a first truncation function and a second truncation function. In this iteration, the application of the first and second truncation functions are altered. In a second iteration 414, we could apply a first truncating function to the first and second hash values 321, 322. The resulting hash 526 is "CCCCCCCCCC-DDDDDDDDDD-E-F."

Next we compare 416 hash 526 to the hash values 521 and 523 stored in hash table 520 to determine if there are two matches between hash values 526 and a first hash table value in 521 or 523 and a last hash table value in 521 or 523. In this comparison 416, we find a match 420 for one of the hash values in 526. Namely, "DDDDDDDDDD" can also be found in the hash 521 corresponding to Location 1. Our methods, however, require two matches, which is an indication that data are stored in an identical sequential pattern within two misaligned blocks in physical storage.

Having determined that we did not find two matches 420, we begin the iterative process again. In this iteration 414 of the truncating hash values 321-324, we again alter which hash values 321-324 will be truncated using the first truncating function and which will be truncated using the second truncating function. Hash 528 shows that the second hash value 322 and the third hash value 323 were truncated using the first truncating function. And the first 321 and last hash values 324 were truncated using the second truncating function.

When we compare 416 the values in hash 528 to those stored in hash table 520, we determine 418 that there is a match between two hash values in 528 and a first and last hash value in hash table 520. Specifically, hash value "DDDDDDDDDD" appears in hash 528 and in hash 521 as the last entry. Hash value "EEEEEEEEEE" appears in hash 528 and as the first value in hash 523. Having found two matches 420, one in a first location, and the second in the last location within the hash table, we designate data block 320 as a duplicate data block. In some embodiments, we could record pointer information within the system so that the user who originally requested that data block 320 be written can access the data block 320 within physical storage by using the pointers.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A computer executable method for deduplicating data within a data storage system during a write operation comprising the steps of:
    prior to writing a data block to memory, creating two or more hash strings corresponding to an unwritten data block, wherein the creating further comprises iteratively truncating two or more hash strings corresponding to the plurality of unwritten data chunks using a first truncating function and a second truncation function, the first truncating function being different than the second truncating function;
    comparing a plurality of values within the iteratively truncated two or more hash strings to a hash table, wherein the hash table contains hash values corresponding to stored data blocks, the stored hash values having been created using the first truncating function and the second truncating function;
    determining if a sequential match between the iteratively truncated two or more hash strings and a first stored hash table value and a last stored hash table value can be found; and
    avoiding writing the unwritten data block if two sequential matches are found.

2. The computer executable method of claim 1, wherein the first truncating function reduces the size of each of the unwritten hash values and the stored hash values to less than 20 bytes.

3. The computer executable method of claim 1, wherein the first truncating function reduces a size of each of the unwritten hash values and the stored hash values to 10 bytes.

4. The computer executable method of claim 1, wherein the second truncating function reduces the size of each of the unwritten hash values and the stored hash values to less than 5 bytes.

5. The computer executable method of claim 1, wherein the second truncating function reduces a size of each of the unwritten hash values and the stored hash values to 1 byte.

6. The computer executable method of claim 1 further comprising writing the unwritten data block if no sequential match is found.

7. The computer executable method of claim 1 further comprising recording at least one pointer in a memory, wherein the at least one pointer is an indication of a location of a duplicate version of the unwritten data block with the data storage system.

8. A system for deduplicating data within a data storage system during a write operation comprising a memory and a processor, the processor configured to perform the steps of:
    prior to writing a data block to memory, creating two or more hash strings corresponding to an unwritten data block, wherein the creating further comprises iteratively truncating two or more hash strings corresponding to the plurality of unwritten data chunks using a first truncating function and a second truncation function, the first truncating function being different than the second truncating function;
    comparing a plurality of values within the iteratively truncated two or more hash strings to a hash table, wherein the hash table contains hash values corresponding to stored data blocks, the stored hash values having been created using the first truncating function and the second truncating function;
    determining if a sequential match between the iteratively truncated two or more hash strings and a first stored hash table value and a last stored hash table value can be found; and
    avoiding writing the unwritten data block if two sequential matches are found.

9. The system of claim 8, wherein the first truncating function reduces the size of each of the unwritten hash values and the stored hash values to less than 20 bytes.

10. The system claim 8, wherein the first truncating function reduces a size of each of the unwritten hash values and the stored hash values to 10 bytes.

11. The system of claim 8, wherein the second truncating function reduces the size of each of the unwritten hash values and the stored hash values to less than 5 bytes.

12. The system of claim 8, wherein the second truncating function reduces a size of each of the unwritten hash values and the stored hash values to 1 byte.

13. The system of claim 8 further comprising writing the unwritten data block if no sequential match is found.

14. The system of claim 8 further comprising recording at least one pointer in a memory, wherein the at least one pointer is an indication of a location of a duplicate version of the unwritten data block with the data storage system.

15. A compute product for deduplicating data within a data storage system during a write operation, the computer program product being embodied in a tangible, non-transitory computer readable storage medium and comprising computer instructions for
    prior to writing a data block to memory, creating two or more hash strings corresponding to an unwritten data block, wherein the creating further comprises iteratively truncating two or more hash strings corresponding to the plurality of unwritten data chunks using a first truncating function and a second truncation function, the first truncating function being different than the second truncating function;
    comparing a plurality of values within the iteratively truncated two or more hash strings to a hash table, wherein the hash table contains hash values corresponding to stored data blocks, the stored hash values having been created using the first truncating function and the second truncating function;
    determining if a sequential match between the iteratively truncated two or more hash strings and a first stored hash table value and a last stored hash table value can be found; and
    avoiding writing the unwritten data block if two sequential matches are found.

16. The computer program product of claim 15, wherein the first truncating function reduces the size of each of the unwritten hash values and the stored hash values to less than 20 bytes.

17. The computer program product of claim 15, wherein the first truncating function reduces a size of each of the unwritten hash values and the stored hash values to 10 bytes.

18. The computer program product of claim 15, wherein the second truncating function reduces the size of each of the unwritten hash values and the stored hash values to less than 5 bytes.

19. The computer program product of claim 15 further comprising writing the unwritten data block if no sequential match is found.

20. The computer program product of claim 15 further comprising recording at least one pointer in a memory, wherein the at least one pointer is an indication of a location of a duplicate version of the unwritten data block with the data storage system.

* * * * *